Feb. 16, 1932.  S. G. BAITS  1,844,939
BRAKE OPERATING MECHANISM
Filed Sept. 18, 1928    2 Sheets-Sheet 1
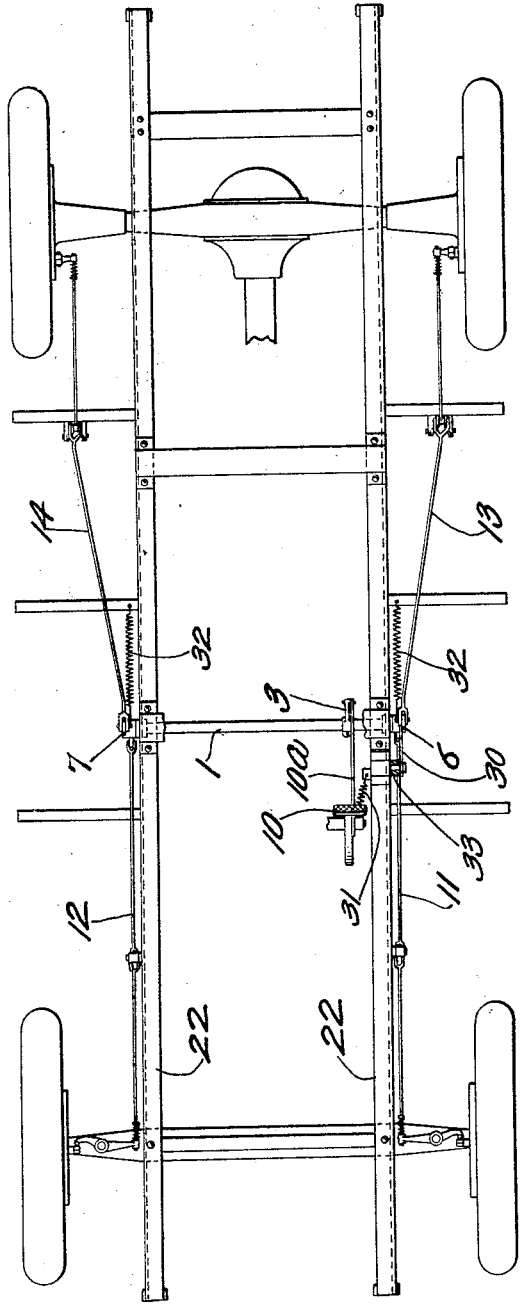
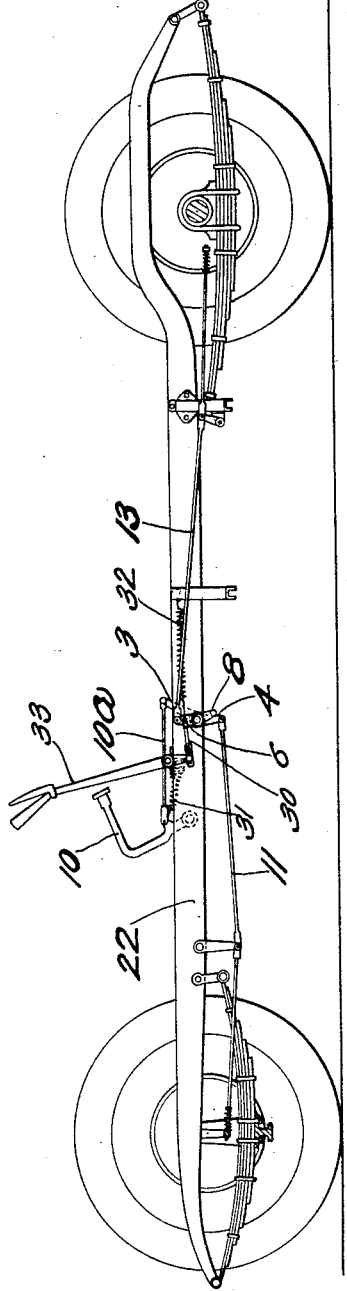
Inventor:
Stuart G. Baits
By Macleod, Calver, Copeland & Dike
Attorneys.

Feb. 16, 1932.  S. G. BAITS  1,844,939
BRAKE OPERATING MECHANISM
Filed Sept. 18, 1928   2 Sheets-Sheet 2
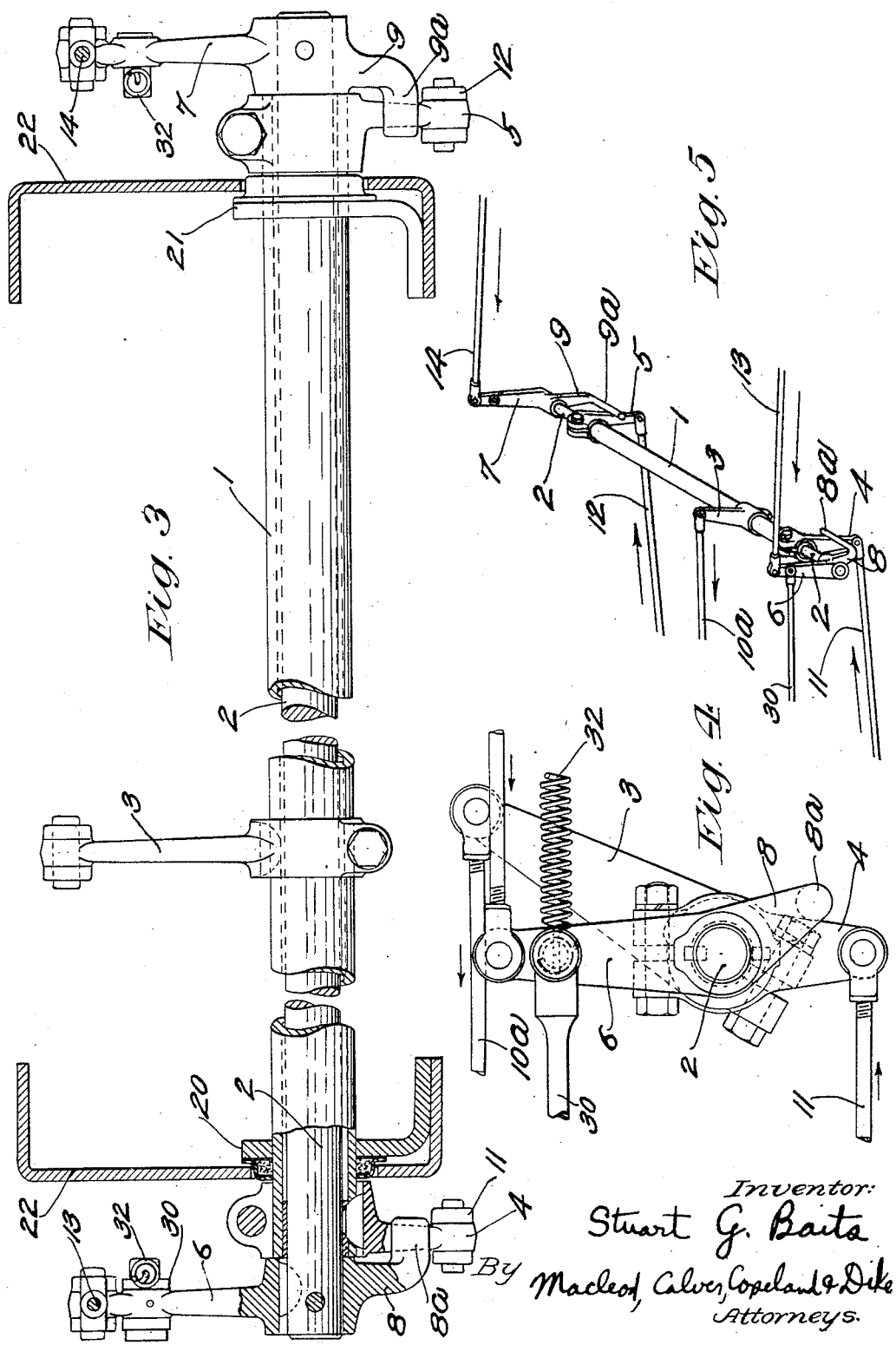
Inventor:
Stuart G. Baits
By Macleod, Calver, Copeland & Dike
Attorneys.

Patented Feb. 16, 1932

1,844,939

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

BRAKE OPERATING MECHANISM

Application filed September 18, 1928. Serial No. 306,628.

This invention relates to improvements in brake operating mechanism for vehicles and it has to do more particularly with a plural arrangement of brake actuating shafts.

An object of the invention is to provide a relatively simple duplex cross shaft arrangement for rendering the brake actuating mechanism more efficient and more dependable.

While the invention is capable of a wide variety of applications it has been designed especially for use in connection with motor vehicles having four wheel brakes, and it has been illustrated and described herein as applied thereto.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will best be understood if the following description is read in connection with the accompanying drawings, in which:

Fig. 1 is a plan view of an automobile chassis equipped with a duplex cross shaft arrangement according to the invention.

Fig. 2 is a left side view of the arrangement shown in Fig. 1.

Fig. 3 is a detail view partly in section of the plural cross shaft arrangement.

Fig. 4 is a detail end view of the cross shaft mechanism as seen from the left side in its normal position.

Fig. 5 is a perspective view illustrating the action of the cross shaft and brake rods.

Referring now to the drawings and particularly to Fig. 3, the numeral 1 denotes a hollow tubular cross shaft extending transversely across an automobile chassis and rotatably mounted in journals 20 and 21 provided therefor in the sills 22 of the chassis. Extending centrally through the outer shaft 1 and substantially concentric therewith is an inner cross shaft 2. The ends of the inner shaft 2 extend somewhat beyond the ends of the outer shaft 1.

Mounted on the ends of the outer shaft 1 are depending arms 4 and 5 respectively, and mounted at the extremities of the inner shaft are the upwardly extending arms 6 and 7. As illustrated in Figs. 1 and 5, the arms 4 and 5 are operatively connected to the front pair of brakes by the connections 11 and 12 respectively and the arms 6 and 7 are operatively connected to the respective rear brakes by the connections 13 and 14. Also mounted at the extremities of the inner shaft 2 are the depending arms 8 and 9 the outer ends of which are offset to provide abutments 8a and 9a engaging the arms 4 and 5. When the outer shaft is rotated to swing the arms 4 and 5, the latter will engage the abutments 8a and 9a and swing the arms 8 and 9, thereby rotating the inner shaft 2.

As shown in Fig. 2 the brake lever 3 is fixed to the outer shaft 1 intermediate its ends and is operatively connected to a brake pedal 10 by a link 10a in the usual way. In operation when the pedal 10 is depressed the brake lever 3 will be swung forwardly thereby rotating the outer shaft 1 in its bearings. As the outer shaft 1 is rotated the arms 4 and 5 carried thereby engage the abutments 8a and 9a carried by the inner shaft 2 thereby causing said inner shaft to rotate in the same direction of motion horizontally of these pairs of arms 6 and 7 carried by the inner shaft 2 are 180° removed from the depending arms 4 and 5 carried by the outer shaft 1 the direction of motion horizontally of these pairs of arms will be directly opposite. The connections 11 and 12 between the front brakes and the arms 4 and 5, and the connections 13 and 14 between the arms 6 and 7, and the rear brakes will thus be drawn inwardly and all the brakes actuated simultaneously. As illustrated the hand or emergency brake lever 33 is preferably connected by an operating rod or link 30 to the arm 6, or if desired to the arm 7 at the right hand side of the car. From this construction it will be seen that the hand brake is connected to the inner shaft permitting independent operation of the rear wheel brakes. It will be noted that the dual across shaft construction also has the advantage of enabling the brakes to be actuated with no more effort than in a single cross shaft system, since when all four brakes are operated simultaneously there is no more frictional resistance to overcome than in the case of a single shaft.

Since the shafts 1 and 2 are operatively connected to each other at both ends it will be seen that even though a break occurs in the inner shaft the braking action will be transmitted from the outer shaft to the arms 8 and 9 mounted at the extremities of the inner shaft thereby insuring simultaneous actuation of all four brakes. Each of the shafts serves to prevent the other from bending, and if either shaft breaks it is supported by the other.

A suitable return spring 31 is secured to the brake lever 10 and to the chassis sill, and return springs 32 connect the arms 6 and 7 with the sills, whereby the mechanism is returned to its normal position when the brake pedal is released, thereby insuring the release of the brakes after the braking operation.

I claim:

1. Brake operating mechanism comprising a hollow outer cross shaft, an inner shaft concentric therewith and extending therethrough, connections between said shafts and the brakes, and means mounted adjacent the ends of the shafts for turning one from the other.

2. In a brake mechanism for an automobile having front and rear wheel brakes, a pair of outer and inner cross shafts one extending centrally through the other, connections between said shafts and the front and rear pairs of brakes, and means for operating one shaft from the other.

3. In a brake mechanism for an automobile having front and rear wheel brakes, a pair of outer and inner cross shafts one extending centrally through the other, connections between said shafts and the front and rear pairs of brakes, and interengaging swinging arms on the shafts for turning one from the other.

4. In a brake mechanism for an automobile having front and rear wheel brakes, a pair of outer and inner cross shafts one extending centrally through the other, connections between said shafts and the front and rear pairs of brakes, a brake lever connected to the outer shaft for turning the same, and devices carried at the ends of the outer shaft for turning the inner shaft.

5. In a brake mechanism for an automobile having front and rear wheel brakes, a pair of outer and inner cross shafts one extending centrally through the other, connections between the outer shaft and a pair of brakes, connections between the inner shaft and the other pair of brakes, and connections between the shafts for turning one from the other.

6. Brake operating mechanism for motor vehicles comprising separate braking means for each wheel, a plurality of transversely extending cross shafts, connections between said shafts and said brakes, a brake lever for operating one of the shafts, a plurality of members mounted on each shaft adapted upon rotation of one of the shafts to contact one with another and rotate shaft.

7. Brake operating mechanism comprising a plurality of independently rotatable brake actuating cross shafts, connections between said shafts and the brakes, and a plurality of interengaging members carried by the shafts adjacent their ends whereby rotation of one of said shafts will cause rotation of the other shaft.

8. Brake operating mechanism comprising a plurality of independently rotatable brake actuating cross shafts, connections between said shafts and the said brakes, and a plurality of interengaging devices carried by the shafts adjacent their ends causing both of said shafts to be rotated in the same direction when one of said shafts is rotated.

9. Brake operating mechanism for motor vehicles having four-wheel brakes comprising a plurality of concentrically mounted cross shafts, said shafts having interengaging members at either end for causing said shafts to rotate simultaneously, and a brake lever operatively connected to one of said shafts.

10. Brake operating mechanism for motor vehicles having four-wheel brakes comprising two concentric cross shafts, connections between said shafts and the front and rear brakes, and means for simultaneously turning said shafts in the same direction.

11. Brake operating mechanism for motor vehicles having front and rear wheel brakes, a pair of cross shafts one extending through the other, cooperating devices carried by said shafts for turning one from the other, means connected to the outer shaft and adapted to be actuated for simultaneously turning both shafts through the cooperation of said devices thereby actuating all four brakes, and means connected to the inner shaft for operating the rear wheel brakes.

12. Brake operating mechanism for motor vehicles having front and rear wheel brakes, comprising two concentric cross shafts, a swinging arm secured to each shaft for separately rocking each shaft, and connections between the arms and the brakes for operating the latter, one of said arms having cooperating abutments whereby the other arm may be swung to turn both shafts.

13. Brake operating mechanism for motor vehicles having front and rear wheel brakes, comprising inner and outer concentric cross shafts, the inner shaft extending beyond the end of the outer shaft, reversely extending swinging arms secured side by side to the ends of the shafts and connected to the brakes, one of said arms having an extension adapted to engage the other arm whereby one arm may be swung to turn both shafts.

In testimony whereof I affix my signature.

STUART G. BAITS.